(12) United States Patent
Fechtenkötter et al.

(10) Patent No.: US 7,511,107 B2
(45) Date of Patent: Mar. 31, 2009

(54) ETHYLENE TERPOLYMER WAXES, THEIR PREPARATION AND THEIR USE

(75) Inventors: Andreas Fechtenkötter, Ludwigshafen (DE); Katrin Zeitz, Mannheim (DE); Michael Ehle, Ludwigshafen (DE); Andreas Deckers, Flomborn (DE); Wolfgang Kasel, Nußloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 866 days.

(21) Appl. No.: 10/704,587

(22) Filed: Nov. 12, 2003

(65) Prior Publication Data

US 2004/0097751 A1    May 20, 2004

(30) Foreign Application Priority Data

Nov. 20, 2002    (DE) ................. 102 54 280

(51) Int. Cl.
*C08F 220/10* (2006.01)
(52) U.S. Cl. .................. 526/323; 526/323.2; 526/324; 526/325; 526/329
(58) Field of Classification Search ................ 526/323, 526/323.2, 324, 325, 329
See application file for complete search history.

(56) References Cited

U.S. PATENT DOCUMENTS

| 4,644,044 A | * | 2/1987 | Gloriod et al. ............. 526/272 |
| 5,700,890 A | | 12/1997 | Chou |
| 6,111,038 A | * | 8/2000 | Kioka et al. ............. 526/123.1 |
| 6,777,096 B2 | * | 8/2004 | Shiba et al. .................. 428/463 |
| 2001/0025021 A1 | | 9/2001 | Wittkowski et al. |

FOREIGN PATENT DOCUMENTS

| DE | 1127901 | | 8/2001 |
| EP | 0 187 250 | * | 11/1985 |
| EP | 437 786 | | 7/1991 |
| JP | 03-019992 | * | 1/1995 |
| JP | 07-233289 | * | 9/1995 |
| WO | 96/27620 | | 9/1996 |
| WO | 98/20056 | | 3/1998 |
| WO | WO 98/20056 | | 5/1998 |

OTHER PUBLICATIONS

Wikipedia definition of "Melt Flow" (2006); http://en.wikipedia.org/wiki/Melt_Flow_Index.*
Waxes, Ullmann's Ency.Ind.Chem.vol. 5, A28 146ff, 1996.
Buback et al., Chem.Ing.Tech, 1994, 66 510-513.
Derwent Abst. 98-262437/24, 1998.

* cited by examiner

*Primary Examiner*—Robert D. Harlan
(74) *Attorney, Agent, or Firm*—Novak Druce + Quigg LLP

(57) ABSTRACT

An ethylene terpolymer wax comprising
  from 40 to 95% by weight of units of ethylene,
  from 0.1 to 40% by weight of units of at least one anhydride of a $C_4$-$C_{10}$-dicarboxylic acid having at least one ethylenic C—C double bond,
  and from 0.1 to 40% by weight of units of at least one ester of the formula I

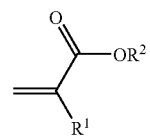

I where $R^1$ is selected from hydrogen, $C_1$-$C_{10}$-alkyl, $C_3$-$C_{12}$-cycloalkyl or $C_6$-$C_{14}$-aryl and $R^2$ is selected from $C_1$-$C_{10}$-alkyl, $C_3$-$C_{12}$-cycloalkyl or $C_6$-$C_{14}$-aryl,
having a molecular weight $M_w$ of up to 20000 g/mol.

13 Claims, No Drawings

ETHYLENE TERPOLYMER WAXES, THEIR PREPARATION AND THEIR USE

The present invention relates to ethylene terpolymer waxes comprising
from 40 to 95% by weight of units derived from ethylene,
from 0.1 to 40% by weight of units derived from at least one anhydride of a $C_4$-$C_{10}$-dicarboxylic acid having at least one ethylenic C—C double bond,
and from 0.1 to 40% by weight of units derived from at least one ester of the formula I

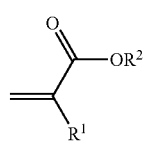

where $R^1$ is selected from hydrogen, $C_1$-$C_{10}$-alkyl, $C_3$-$C_{12}$-cycloalkyl or $C_6$-$C_{14}$-aryl and $R^2$ is selected from $C_1$-$C_{10}$-alkyl, $C_3$-$C_{12}$-cycloalkyl or $C_6$-$C_{14}$-aryl,
having a molecular weight $M_w$ of up to 20000 g/mol.

As a rule, floor care compositions, for example wax floor polishes, have to meet high requirements. In addition to a favorable price, they should have a long shelf life and should also be easy to apply. The floors should have an attractive gloss and they should be capable of being walked on safely for a very long time. As a rule, attempts are made to establish these properties through the emulsifiable ethylene polymer used, which is employed as a component in the floor care composition.

The industrially known emulsifiable ethylene polymers are oxygen-containing ethylene polymers in which the oxygen can be introduced in various ways. A known two-stage process comprises the preparation of oxygen-free polyethylene waxes by free radical or Ziegler-Natta polymerization of ethylene, followed by the oxidation of the resulting polyethylene waxes by air or peroxides or pure oxygen or mixtures thereof, to give oxidate waxes. However, this last-mentioned process has technical disadvantages.

The oxidation of a polyethylene results in a reduction in the molecular weight of the parent polyethylene chains, which is disadvantageous for the hardness of the product. Moreover, the preparation of oxidate waxes is always a two-stage process, which requires additional investment (cf. for example: *Ullmann's Encyclopedia of Industrial Chemistry*, 5th edition, key words: Waxes, Vol. A 28, page 146 et seq., Verlag Chemie Weinheim, Basle, Cambridge, N.Y., Tokyo, 1996).

U.S. Pat. No. 4,644,044 discloses terpolymers of from 50 to 99.2% by weight of ethylene, from 0.3 to 10% by weight of maleic anhydride and from 0.5 to 40% by weight of alkyl (meth)acrylate. They have a melt flow index of from 0.1 to 500 dg/min and are obtained by terpolymerization, wherein at least one precompressor and one secondary compressor must be present in the reaction apparatus. The terpolymers disclosed have a rubber-like property, and the conversion of 10% in the disclosed Example 1 is disadvantageously low.

EP-A 0 437 786 discloses rubber-like graft copolymers which contain acid anhydride groups and are terpolymers of $C_2$-$C_8$-olefins, alkenecarboxylic acids or the esters thereof and maleic anhydride. Said rubber can be used for improving the impact resistance of semicrystalline polyamides and thermoplastic polycarbonates. They have a solubility of at least 90% in hot solvents, for example toluene, but cannot be sufficiently emulsified.

It is an object of the present invention
to provide novel ethylene terpolymer waxes,
to provide a process for the preparation of the novel ethylene terpolymer waxes, and in particular
to provide novel floor care compositions which have improved properties compared with the prior art.

We have found that this object is achieved by the ethylene terpolymer waxes defined at the outset.

The novel ethylene terpolymer waxes are waxy terpolymers of ethylene and at least 2 comonomers, the waxes usually having a melt viscosity of from 400 to 25000, preferably from 2000 to 10000 or from 2250 to 4000, mm²/s, measured at 120° C. according to DIN 51562. Their acid number is from 1 to 170, preferably from 25 to 150, mg KOH/g wax, determined according to DIN 53402. The melting points are from 55 to 110° C., preferably from 60 to 102° C., determined by DSC according to DIN 51007. The density is usually from 0.89 to 0.99, preferably from 0.92 to 0.96, g/cm³, determined according to DIN 53479.

Even if the novel ethylene terpolymer waxes contain units which are derived from more than three different monomers, for example from ethylene, an ester of the formula I and anhydrides of two different $C_4$-$C_{10}$-dicarboxylic acids, they are referred to as novel ethylene terpolymer waxes in the context of the present invention.

According to the invention, the novel ethylene terpolymer waxes are composed of the following units:
from 40 to 95, preferably at least 55, particularly preferably at least 70, % by weight of units derived from ethylene,
from 0.1 to 40, preferably from 1 to 30, particularly preferably from 5 to 25, % by weight of units derived
from at least one anhydride of a $C_4$-$C_{10}$-dicarboxylic acid having at least one ethylenic C—C double bond
and from 0.1 to 40%, preferably from 1 to 30, particularly preferably from 5 to 25, % by weight of units derived from at least one ester of the formula I

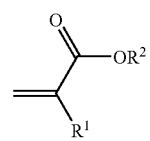

where $R^1$ is selected from
hydrogen,
$C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl and n-decyl; particularly preferably $C_1$-$C_4$-alkyl, such as methyl, ethyl, n-propyl, isopropyl, n-butyl, isobutyl, sec-butyl and tert-butyl;
$C_3$-$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;
$C_6$-$C_{14}$-aryl, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

and $R^2$ is selected from
$C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sechexyl, n-heptyl, n-octyl, n-nonyl and n-decyl; preferably $C_1$-$C_4$-alkyl, such as methyl, ethyl, n-propyl, isopropyl, n-butyl, isobutyl, sec-butyl and tert-butyl, in particular methyl or ethyl;

$C_3$-$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_6$-$C_{14}$-aryl, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

In an embodiment of the present invention, $R^1$ in formula I is selected from hydrogen and methyl. In a further embodiment of the present invention, $R^2$ is methyl.

The corresponding units are introduced by incorporation of the corresponding monomers in the form of polymerized units. Terminal units may carry C—C double bonds; units which are not terminal have C—C single bonds.

Particularly suitable units derived from anhydrides of at least one $C_4$-$C_{10}$-dicarboxylic anhydride with at least one ethylenically unsaturated C—C double bond are those anhydrides in which at least one double bond in the corresponding monomer is present in conjunction with at least one C—C double bond. For example, units of the formula IIa

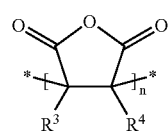

II a where $R^3$ and $R^4$ are selected as follows:
hydrogen,
$C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl or sec-hexyl,
$C_2$-$C_6$-alkenyl, such as vinyl, isobutenyl or 1-allyl, phenyl, $R^3$ and $R^4$ together having not more than 6 carbon atoms, are suitable.

Anhydride units, for example of the formula IIb

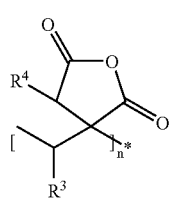

II b where $R^3$ and $R^4$ are as defined above, are furthermore suitable.

For example, these are anhydride units of only one $C_4$-$C_{10}$-carboxylic acid. For example, the anhydride units of the $C_4$-$C_{10}$-carboxylic acid are maleic anhydride units, i.e. $R^3$=$R^4$=hydrogen in formula IIa.

In another example, the anhydride units of a $C_4$-$C_{10}$-carboxylic acid are itaconic anhydride units, i.e. $R^3$=$R^4$=hydrogen in formula IIb.

The units of ethylene, of the anhydride or anhydrides and of the ester or esters of the formula I are usually randomly distributed in the ethylene terpolymer wax molecules.

The novel ethylene terpolymer waxes have a molecular weight $M_w$ of up to 20000 g/mol.

The novel ethylene terpolymer waxes can be readily kneaded at above 70° C.

The present invention furthermore relates to a process for the preparation of the novel ethylene terpolymer waxes.

The preparation of the novel ethylene terpolymer waxes can be carried out in stirred high-pressure autoclaves or in high-pressure tubular reactors. The preparation in stirred high-pressure autoclaves is preferred. The stirred high-pressure autoclaves used for the novel process are known per se and are described in *Ullmann's Encyclopedia of Industrial Chemistry*, 5th edition, key words: Waxes, Vol. A 28, page 146 et seq., Verlag Chemie Weinheim, Basle, Cambridge, N.Y., Tokyo, 1996. They predominantly have a length/diameter ratio of from 5:1 to 30:1, preferably from 10:1 to 20:1. The high-pressure tubular reactors which can likewise be used are also described in *Ullmann's Encyclopedia of Industrial Chemistry*, 5th edition, key words: Waxes, Vol. A 28, page 146 et seq., Verlag Chemie Weinheim, Basle, Cambridge, N.Y., Tokyo, 1996.

Suitable pressure conditions for the polymerization are from 500 to 4000, preferably from 1500 to 2500, bar.

The reaction temperatures are from 170 to 300° C., preferably from 200 to 280° C.

The novel process can be carried out in the presence of a regulator. The regulator used is, for example, hydrogen or an aliphatic aldehyde or an aliphatic ketone of the formula III

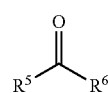

III or a mixture thereof.

Here, $R^5$ and $R^6$ are identical or different and are selected from
hydrogen;
$C_1$-$C_6$-alkyl, such as methyl, ethyl, n-propyl, isopropyl, n-butyl, isobutyl, sec-butyl, tert-butyl, npentyl, isopentyl, sec-pentyl, neopentyl, 1,2-dimethylpropyl, isoamyl, n-hexyl, isohexyl and sechexyl, particularly preferably $C_1$-$C_4$-alkyl, such as methyl, ethyl, n-propyl, isopropyl, n-butyl, isobutyl, sec-butyl and tert-butyl;
$C_3$-$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl.

In a particular embodiment, $R^5$ and $R^6$ are covalently bonded to one another with formation of a 4- to 13-membered ring. Thus $R^5$ and $R^6$ together may be, for example, —(CH$_2$)$_4$—, —(CH$_2$)$_5$—, —(CH$_2$)$_6$—, —(CH$_2$)$_7$—, —CH(CH$_3$)—CH$_2$—CH$_2$—CH(CH$_3$)— or —CH(CH$_3$)—CH$_2$—CH$_2$—CH$_2$—CH(CH$_3$)—.

Very suitable regulators are alkylaromatic compounds, for example toluene, ethylbenzene or one or more isomers of xylene. It is preferable to carry out the polymerization in the presence of toluene. Alkylaromatic compounds, for example toluene, are preferably employed as regulator and the use of aldehydes and ketones of the formula III is dispensed with.

Initiators which may be used for free radical polymerization are the conventional free radical initiators, for example organic peroxides, oxygen or azo compounds. Mixtures of a plurality of free radical initiators are also suitable.

Suitable peroxides, selected from the commercially available substances, are didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy2-ethylhexanoate, tert-butyl peroxydiethylacetate, tert-butyl peroxydiethylisobutyrate, 1,4-di(tert-butylperoxycarbonyl)cyclohexane as an isomer mixture, tertbutyl perisononanoate, 1,1-di(tert-butylperoxy)3,3,5-trimethylcyclohexane, 1,1-di(tert-butylperoxy)cyclohexane, methyl isobutyl ketone peroxide, tertbutyl peroxyisopropylcarbonate, 2,2-ditert-butylperoxybutane or tert-butyl peroxyacetate;

tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropylbenzene monohydroperoxide, cumyl hydroperoxide or tert-butyl hydroperoxide; or dimeric or trimeric ketone peroxides of the formulae IVa to IVc.

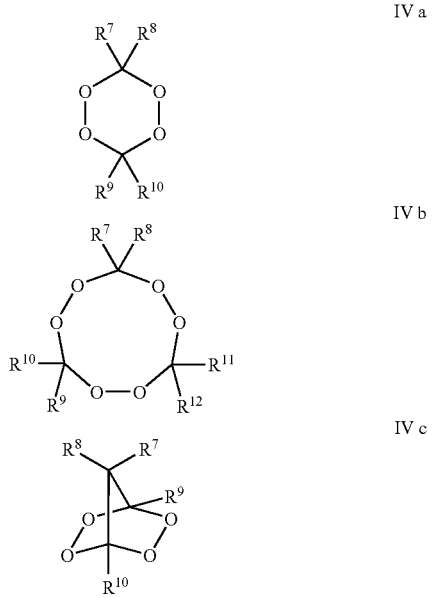

Here, $R^7$ to $R^{12}$ are identical or different and are selected from $C_1$-$C_8$-alkyl, such as methyl, ethyl, n-propyl, isopropyl, n-butyl, sec-butyl, isobutyl, tert-butyl, npentyl, sec-pentyl, isopentyl, n-hexyl, n-heptyl and n-octyl; preferably linear $C_1$-$C_6$-alkyl, such as methyl, ethyl, n-propyl, n-butyl, isobutyl, n-pentyl, isopentyl, n-hexyl, isohexyl and sec-hexyl, particularly preferably linear $C_1$-$C_4$-alkyl, such as methyl, ethyl, n-propyl and n-butyl, very particularly preferably ethyl;

$C_6$-$C_{14}$-aryl, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

Peroxides of the formulae IVa to IVc and processes for their preparation are disclosed in EP-A 0 813 550.

Particularly suitable peroxides are di-tert-butyl peroxide, tert-butyl peroxypivalate, tert-butyl peroxyisononanoate and dibenzyl peroxide and mixtures thereof. An example of an azo compound is azobisisobutyronitrile (AIBN). Free radical initiators are metered in amounts customary for polymerizations. Suitable solvents are, for example, isododecane and toluene.

Monomers used are ethylene, at least one anhydride of a $C_4$-$C_{10}$-dicarboxylic acid having at least one ethylenic C—C double bond and at least one ester of the formula I.

The anhydride or the anhydrides of $C_4$-$C_{10}$-carboxylic acids is or are preferably solid at room temperature. In a further aspect, the anhydride or the anhydrides of $C_4$-$C_{10}$-carboxylic acids is or are solid under standard conditions, i.e. room temperature and 1 bar.

In a further preferred aspect of the present invention, the ester of the formula I is liquid at room temperature.

The ratio of the monomers during the metering usually does not correspond exactly to the ratio of the units in the novel ethylene terpolymer waxes because the anhydrides of $C_4$-$C_{10}$-dicarboxylic acids having at least one ethylenic C—C double bond and esters of the formula I are more readily incorporated than ethylene into the novel ethylene terpolymer waxes.

The novel process is preferably carried out in the presence of solvents, where mineral oils and other solvents which are present in small amounts in the novel process and, for example, were used for desensitizing the free radical initiator or initiators are considered to be solvents for the novel process in the context of the present invention. The novel process is preferably carried out in the presence of alkylaromatic compounds as solvents, for example toluene, ethylbenzene or xylene.

The monomers are usually metered together or separately. In an embodiment of the present invention, at least one anhydride of a $C_4$-$C_{10}$-dicarboxylic acid having at least one ethylenic C—C double bond and at least one ester of the formula I are first mixed. This embodiment is preferred in particular when at least one anhydride of a $C_4$-$C_{10}$-dicarboxylic acid having at least one ethylenic C—C double bond is solid at room temperature and at least one ester of the formula I is liquid under standard conditions. The mixture thus prepared can be mixed with alkylaromatic compounds and then metered together with the ethylene stream or parts of the ethylene stream directly into the high-pressure region.

The monomers can be compressed to the polymerization pressure in a compressor. In another embodiment of the novel process, the monomers are first brought to an elevated pressure of, for example, from 150 to 400, preferably from 200 to 300, in particular 250, bar with the aid of a pump and then brought to the actual polymerization pressure using a compressor.

The novel ethylene terpolymer waxes can be excellently dispersed; in particular, they can be particularly readily emulsified in the molten state. The present invention therefore relates to dispersions, in particular aqueous dispersions, comprising the novel ethylene terpolymer waxes.

The novel dispersions preferably comprise from 1 to 40% by weight of one or more novel ethylene terpolymer waxes, from 60 to 98% by weight of water, one or more basic substances, for example hydroxides and/or carbonates of alkali metals, ammonia, organic amines, for example triethylamine, diethylamine, ethylamine, trimethylamine, dimethylamine, methylamine, ethanolamine, diethanolamine, triethanolamine, methyldiethanolamine, n-butyldiethanolamine or N,N-dimethylethanolamine, and, if required, further components, for example ethylene glycol, diethylene glycol or further dispersants.

The novel dispersions usually have a basic pH, preferably a pH of from 7.5 to 14, particularly preferably 8 or higher, very particularly preferably 9 or higher.

The present invention furthermore relates to the use of the novel ethylene terpolymer waxes or of the novel dispersions as floor care compositions or as components in floor care compositions.

The ability of the novel dispersions to form colorless, clear, glossy films can be utilized in floor care compositions. The nonslip properties and the suitability of floors for walking on can be improved by said floor care compositions.

A typical novel floor care composition comprises
from 10 to 20 parts by weight of the novel dispersions, which impart resilience, dirt-repellent behavior and gloss to the floor to be cared for,
from 0.5 to 5, preferably from 2 to 3, parts by weight of diethylene glycol,
from 0.1 to 10, preferably from 1 to 2, parts by weight of ethylene glycol,
from 0.1 to 10, preferably from 1 to 2, parts by weight of a permanent plasticizer, examples of plasticizers used being trialkyl phosphates, particularly preferably tri-(n-butoxy-ethyl) phosphate,
from 0.1 to 5, preferably from 0.5 to 1.5, parts by weight of a wetting and leveling agent, examples of wetting and leveling agents used being fluorinated surfactants, for example FC-129 from 3M,
from 20 to 30 parts by weight of a dispersion of polystyrene/acrylate as carrier material. A preferred example is Poligen® MF750.

The novel floor care composition is prepared by mixing the components, for example in a bucket, stirring together for 5 minutes generally being sufficient.

The present invention furthermore relates to the use of the novel ethylene terpolymer waxes as a component for coatings, for example for the coating of paper, films or metals for corrosion protection. The present invention furthermore relates to the use of the novel ethylene terpolymer waxes in inks and surface coatings, for example printing inks and finishes.

It is also possible to use the novel ethylene terpolymer waxes as a component of lubricants and as a precipitating agent in wastewater treatment.

The invention is illustrated by working examples.

WORKING EXAMPLE

1. Preparation of Novel Ethylene Terpolymer Waxes

First, a mixture of 50% by weight each of maleic anhydride and methyl acrylate (comonomers) was prepared. This mixture was liquid under standard conditions. It was then diluted with toluene so that it contained altogether 50% by weight of comonomers. Ethylene and the mixture of the comonomers diluted with toluene were copolymerized in a high-pressure autoclave, as described in the literature (M. Buback et al., *Chem. Ing. Tech.* 1994, 66, 510). For this purpose, further amounts of toluene, ethylene and the mixture of the comonomers which had been diluted with toluene and to which an initiator solution comprising tert-butyl peroxypivalate (from 0.1 to 0.15 mol×l$^{-1}$) dissolved in toluene was added were fed in under the reaction pressure of 1700 bar. Table 1 lists the polymerization conditions and table 2 lists the analytical data of the novel ethylene terpolymer waxes obtained.

The content of ethylene, maleic anhydride and methyl acrylate in the novel ethylene terpolymer waxes was determined by NMR spectroscopy or by titration (acid number). The acid number of the polymers was determined titrimetrically according to DIN 53402. The KOH consumption corresponds to the maleic anhydride content in the polymer.

TABLE 1

| | | Feed | | | | | | Conversion [% by weight] | | |
|---|---|---|---|---|---|---|---|---|---|---|
| No. | T [° C.] | Ethylene [g/h] | Comonomers + Tl [ml/h] | Tl [g/h] | MAA [g/h] | MA [g/h] | TBPP in Tl [ml/h] | Ethylene | MSA | MA |
| 1 | 220 | 12000 | 4850 | 2100 | 1184 | 1184 | 1350 | 18 | 65 | 66 |
| 2 | 218 | 12000 | 2400 | 1040 | 586 | 586 | 1300 | 17 | 59 | 65 |
| 3 | 218 | 12000 | 1600 | 692 | 692 | 391 | 391 | 19 | 61 | 75 |

Abbreviations used: Tl=toluene; MAA: maleic anhydride, MA: methyl acrylate, TBPP: tert-butyl peroxypivalate. The concentrations of the initiator solutions were as follows: Example No. 1: 0.15 molar; Example No. 2: 0.12 molar, Example No. 3: 0.10 molar. All volumetric data are based on standard conditions.

The analytical data of the novel ethylene terpolymer waxes are shown in table 2.

TABLE 2

Analytical data of the novel ethylene terpolymer waxes.

| | Composition NMR/titrimetric | | | Acid number [mg KOH g$^{-1}$] | ρ (23° C.) [g cm$^{-3}$] | ν (120° C.) [mm$^2$ s$^{-1}$] | Mp. [° C.] |
|---|---|---|---|---|---|---|---|
| No. | Ethylene | MAA | MA | | | | |
| 1.1 | 58.1 | 20.8 | 21.1 | 145 | n.d. | 3480 | 60-70 |
| 1.2 | 74.1 | 12.3 | 13.6 | 91 | n.d. | 2340 | 60-70 |
| 1.3 | 81.1 | 8.5 | 10.4 | 72 | 0.9668 | 3640 | 66.4 |

The melt viscosity was determined with the aid of DSC according to DIN 51562 and the melting points with the aid of DSC DIN 51007. The composition was stated in each case in % by weight.

n.d.: not determined

2. Preparation of a Novel Dispersion 933 g of water were initially taken in a 2 liter stirred pot having an anchor stirrer and reflux condenser and were preheated to 90° C. 400 g of the novel ethylene terpolymer wax from example 1.1 were added in portions in the course of 30 minutes and the mixture was refluxed. 22.72 g of 50% by weight aqueous KOH were then added with vigorous stirring. Finally, a further 267 g of water were added and the resulting dispersion was cooled to room temperature. The pH of the dispersion obtained was 11, the solids content was 24.3% by weight and the mean particle size was 180-190 nm, determined according to ISO 13321 using an Autosizer IIC (from Malvern) with the following parameters:

| | |
|---|---|
| Measuring temperature: | 23.0° C. |
| Measuring time: | 200 seconds (10 cycles of 20 s each) |
| Scattering angle: | 90° |
| Laser wavelength: | 633 nm (HeNe) |

What is claimed is:

1. An ethylene terpolymer wax comprising
from 40 to 95% by weight of units derived from ethylene,
from 0.1 to 40% by weight of units derived from at least one anhydride of a $C_4$-$C_{10}$-dicarboxylic acid having at least one ethylenic C—C double bond,
and from 0.1 to 40% by weight of units derived from at least one ester of the formula I

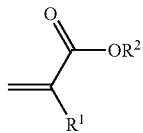

where $R^1$ is selected from hydrogen, $C_1$-$C_{10}$-alkyl, $C_3$-$C_{12}$-cycloalkyl or $C_6$-$C_{14}$-aryl and $R^2$ is selected from $C_1$-$C_{10}$-alkyl, $C_3$-$C_{12}$-cycloalkyl or $C_6$-$C_{14}$-aryl,
having a molecular weight $M_w$ of up to 20000 g/mol.

2. An ethylene terpolymer wax as claimed in claim 1, wherein $R^1$ in formula I is selected from hydrogen and methyl.

3. An ethylene terpolymer wax as claimed in claim 1, wherein $R^2$ in formula I is methyl.

4. A process for the preparation of ethylene terpolymer waxes, as claimed in any of claims 1, wherein ethylene, at least one ester of the formula I and at least one anhydride of a $C_4$-$C_{10}$-dicarboxylic acid having at least one ethylenic C—C double bond are polymerized with one another at from 500 to 4000 bar and from 170 to 300° C.

5. A process as claimed in claim 4, wherein polymerization is effected in the presence of alkylaromatic compounds.

6. A process as claimed in claim 4, wherein the anhydride of the dicarboxylic acid or the anhydrides of the dicarboxylic acids is or are solid at room temperature.

7. An ethylene terpolymer wax as claimed in claim 1, wherein maleic anhydride is selected as the anhydride of the dicarboxylic acid.

8. A process as claimed in claim 6, wherein at least one ester of the formula I is mixed with at least one anhydride of a $C_4$-$C_{10}$-dicarboxylic acid before the polymerization and metered together into the polymerization reactor.

9. An aqueous dispersion comprising one or more ethylene terpolymer waxes as claimed in any of claim 1.

10. A floor care composition comprising an aqueous dispersion as claimed in claim 9.

11. An ethylene terpolymer wax as claimed in claim 1, having a melt viscosity of from 400 to 25000 mm²/s.

12. An ethylene terpolymer wax as claimed in claim 11, having a melt viscosity of from 2000 to 25000 mm²/s.

13. An ethylene terpolymer wax as claimed in claim 12, having a melt viscosity of from 2000 to 10000 mm²/s.

* * * * *